Dec. 5, 1944.   R. R. ROEMER   2,364,475
POWER OPERATED MACHINE TOOL
Filed July 11, 1942   3 Sheets-Sheet 1

INVENTOR.
Ralph R. Roemer
BY Harry P. Canfield
ATTORNEY.

Dec. 5, 1944.  R. R. ROEMER  2,364,475
POWER OPERATED MACHINE TOOL
Filed July 11, 1942  3 Sheets-Sheet 2
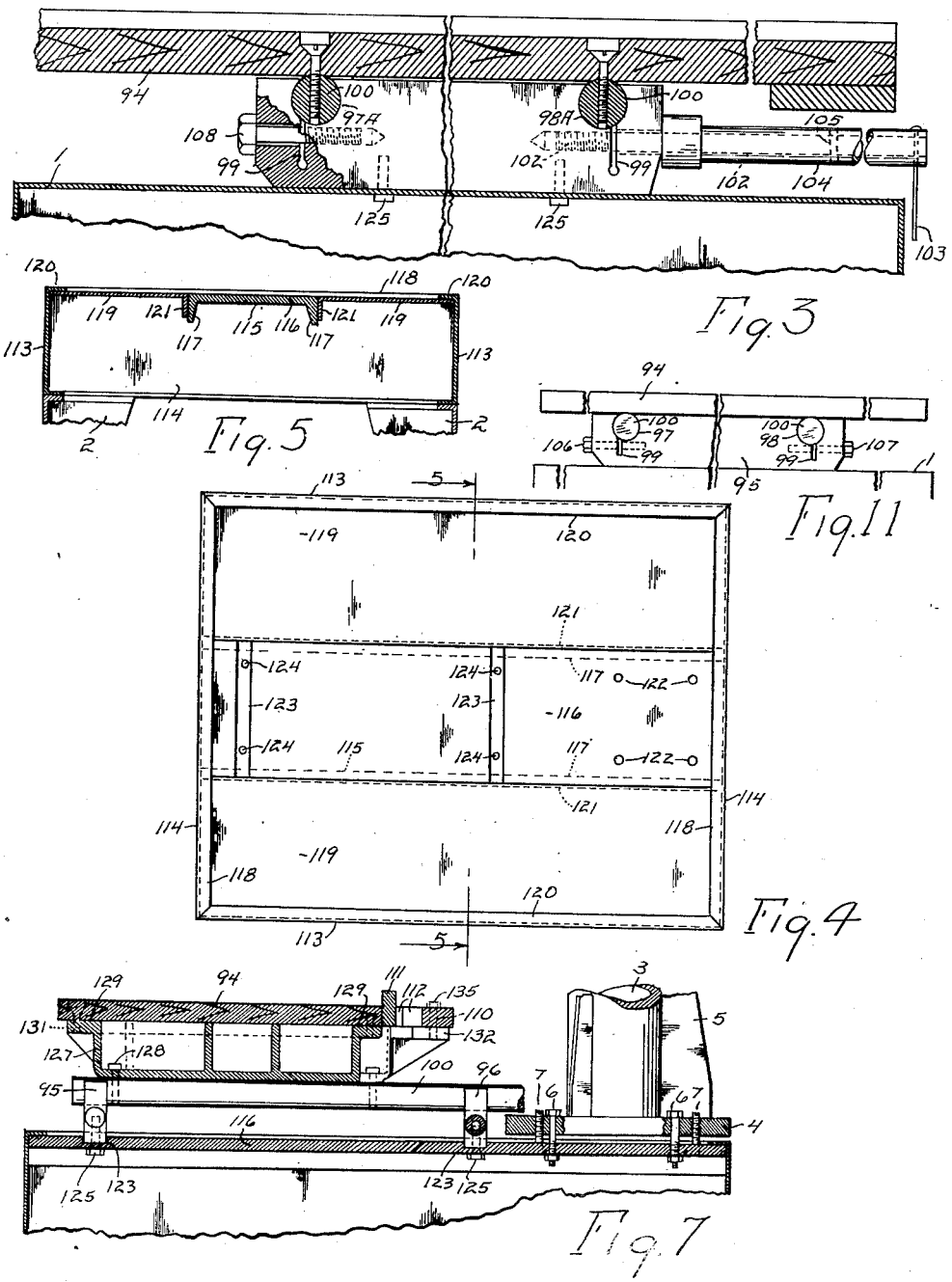
INVENTOR.
Ralph R. Roemer
BY Barry P. Canfield
ATTORNEY.

Dec. 5, 1944.   R. R. ROEMER   2,364,475
POWER OPERATED MACHINE TOOL
Filed July 11, 1942   3 Sheets-Sheet 3

INVENTOR.
Ralph R. Roemer
BY Harry P. Canfield
ATTORNEY.

Patented Dec. 5, 1944

2,364,475

UNITED STATES PATENT OFFICE 2,364,475

POWER OPERATED MACHINE TOOL

Ralph R. Roemer, Cleveland, Ohio

Application July 11, 1942, Serial No. 450,528

3 Claims. (Cl. 143—132)

This invention relates to machine tools of the type comprising a power-driven rotary tool; and has particular application to power-driven rotary tools that are variably positionable with respect to work to be operated upon, and in which the work is movable relative to the tool.

Subject matter illustrated and described herein but not claimed is claimed in my Patent No. 2,343,243, March 7, 1944.

A machine of this general type furthermore constitutes the subject matter of my Patent No. 1,956,835, dated May 1, 1934, and the machine tool of this application is an improvement over that of the patent.

Machine tools of this general type comprise generally a horizontal arm supported on a suitable frame and extending over a work table. The arm supports a horizontal trackway, and a motor driven rotary tool, particularly a saw or the like, is supported by a carriage reciprocable along the trackway. The trackway is mounted on the arm so as to swing on a vertical axis, and can be locked in any desired swung position to determine the direction of movement of the carriage and saw, and a dial scale is provided to accurately determine the angular position of the trackway.

The saw and motor are mounted on the carriage so as to swing on a horizontal axis thereon, and may be locked in any desired angular position to determine the angle of the rotational plane of the saw or like tool with respect to the work table; and a dial scale is provided to selectively determine the saw angle.

Mechanism is provided to raise and lower the arm and tool relative to the work table and to lock them in any elevational position.

The work is supported on a table-top which is reciprocable toward and from the column to vary its position with respect to the saw, and means is provided to lock the table-top in all positions; and by this arrangement the saw may be moved through the work, for example in cross-cutting, or the work may be moved through the saw, for example in rip cutting.

With reference to a machine tool of this general character, it is among the objects of the invention:

To provide generally an improved work table for supporting work to be operated upon by the tool;

To provide an improved work table and positioning and locking means therefor;

To provide for the work table an improved table top and table top support;

To provide a work table which may be reciprocated to position work thereon relative to the tool, and which may be optionally locked in any desired reciprocated position.

Other objects will be apparent to those skilled in the art to which my invention appertains.

My invention is fully disclosed in the following description taken in connection with the accompanying drawings in which, Fig. 1 is a side elevational view of a tool of the class referred to and embodying my invention;

Fig. 3 is a sectional view taken from the plane 3—3 of Fig. 1 or of Fig. 2;

Figs. 4 and 5 are views illustrating the preferred construction of a main base or table of the machine which has been shown in more simplified form in the foregoing figures, Fig. 4 being a top plan view of the table or base with parts to be mounted thereon omitted; and Fig. 5 being a cross-sectional view taken from the plane 5—5 of Fig. 4;

Fig. 7 is a forward and rearward longitudinal sectional view of the top portion of the table of Figs. 4 and 5 with the column of the tool mounted thereon and showing in longitudinal section the table top and the supports therefor of Fig. 6;

Fig. 11 is a fragmentary elevational view taken in the direction of the arrow 11 of Fig. 1 or Fig. 2.

Figure 2:
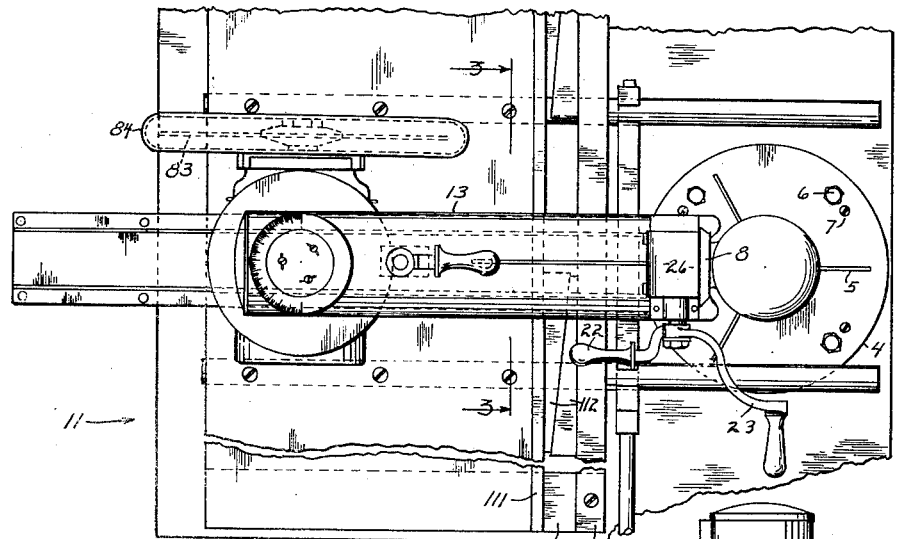
Fig. 2 is a top plan view of the machine tool of Fig. 1.
Figure 1:
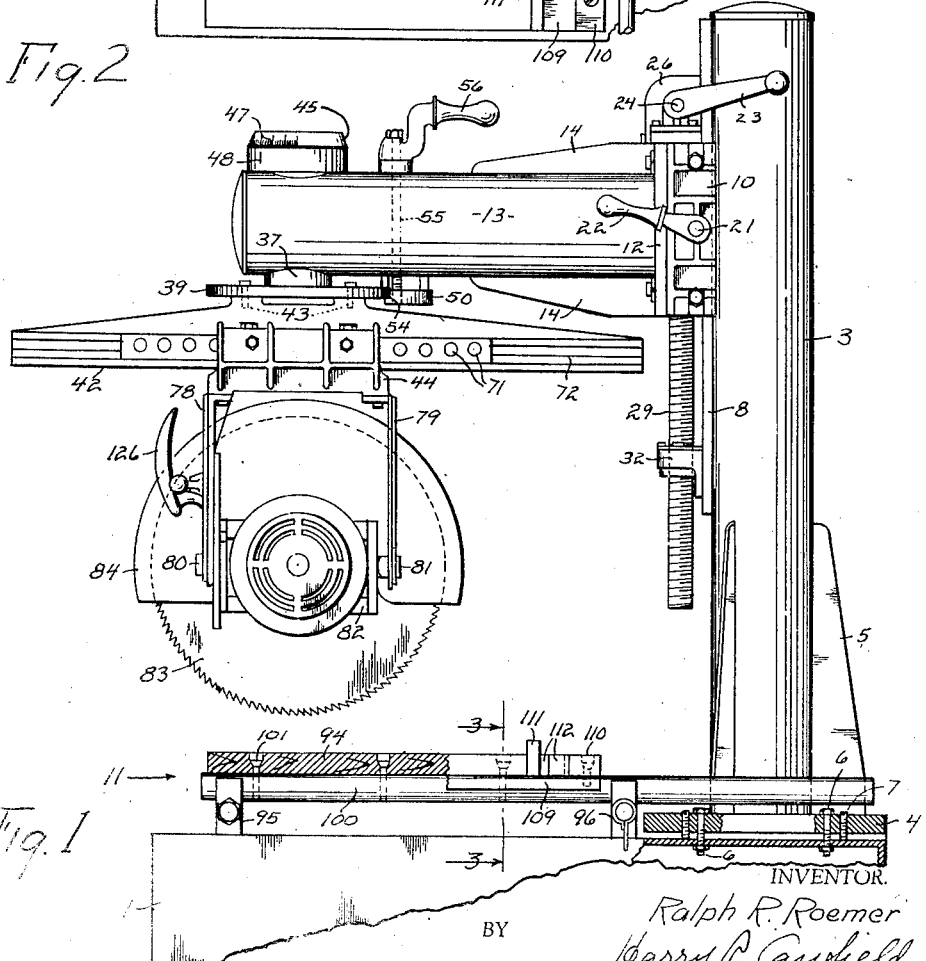

Referring to the drawings, Figs. 1, 2, and 5, I have shown generally at 1, a main base or table, provided with supporting legs 2—2. This table may be variously constructed, and the preferred construction will be presently described. It is here illustrated in simplified form. Upon the top of the table, and at the rearward side thereof, is mounted a vertical column 3, preferably in the form of a steel tube, Fig. 7, secured, for example by welding, at its lower end to a steel flange 4, which is preferably circular in form; and the column is braced to the flange 4 by ribs 5—5, welded to the column and to the flange; and the flange 4 is secured to the top of the table 1 by bolts 6—6 and adjusting screws 7—7.

The bolts are projected through perforations in the flange 4 and through the upper surface of the main base or table, as shown in Figs. 1 and 7, and the screws 7 are threaded into the flange 4 and engage the upper side of the table. By loosening a bolt 6 and screwing in the corresponding screw 7, or by loosening the screw 7 and tightening the corresponding bolt 6, the column 3 may be adjusted into true vertical position or into such position that the tool moving back and forth along the trackway, as will be described, will move parallel to the work-table-top in crosscutting or ripping.

Upon the forward face of the column is welded a guide 8, Figs. 1 and 2 upon which is vertically slidable a slide 10 to which is bolted a vertical flange 12 forming part of a horizontal arm 13.

The arm 13 is preferably in the form of a steel tube, with the flange 12 welded thereto, and bracing ribs 14—14 welded to the flange 12 and to the outer wall of the tube 13, brace the same and render it rigid.

In the operation of the parts to be described, the arm 13 may be locked in any elevated position on the guide 8 by clamping means, comprising a bolt 21 passing through the slide 10 and having a handle 22 welded to the bolt, whereby by means not shown, upon turning the handle the slide is gripped to the guide 8.

When the handle 22 is operated to free the slide, the arm 13 may be moved to change the elevation thereof by the following means.

Upon the upper side of the slide 10 is mounted a shaft 24 having a crank 23 to turn it. A screw 29 extends parallel to the guide 8. Gears in a housing 26 carried by the slide rotate the screw when the crank is turned, the screw travelling longitudinally with the slide. The screw meshes with a nut 32 mounted on the forward face of the column 3 or upon the guide 8.

From the foregoing it will now be apparent that upon loosening the slide 10 by the handle 22, and upon then rotating the crank 23, the screw 29 will be turned, and reacting upon the slide 10 will cause the slide and the arm to be raised or lowered, thereby raising or lowering the tool on the arm 13 to be referred to; and after the desired degree of elevation has thus been attained, the slide may be clamped upon the guideway 8 by the handle 22. The weight of the arm and tool while being adjustably elevated is carried by the slide 10, and transmitted to the screw 29.

In the other end portion of the arm 13 is rotatably mounted on a vertical axis, a stem 37. Upon a lower portion of the stem 37 is secured, a plate 39 in the form of a disc.

A carriage trackway illustrated generally at 42 is secured to the underside of the disc 39, for example by bolts 43, 43; and the entire trackway 42 may be rotated about the axis of the stem 37; and a tool supporting carriage, shown generally at 44, is provided, arranged to be moved horizontally along the trackway 42, on ball bearings 71—71 running on rectilinear raceways 72.

A circular dial 45 is secured upon the upper outer end of the stem 37 and is graduated in degrees, as at 47. A stationary ring 48 on the arm 13 has a reference line suitably located thereon by which the dial 45 may indicate the rotated position of the trackway.

The trackway may be locked in any swung position around the axis of the stem 37 by the following means. A dog 50 is provided on the underside of the arm 13 and hingedly connected thereto. The dog has a notch 54 therein engaging the periphery of the disc 39. A bolt 55 is projected downwardly through aligned perforations in the upper and lower sides of the arm 13, the lower end of the bolt being threaded into the dog 50. The upper end of the bolt is connected to a handle 56 above the arm. By rotating the handle the bolt 55 draws the dog upwardly, clamping it upon the disc periphery, and the friction thereby effected locks the disc to the arm. Upon rotating the handle 56 in the other direction the disc is freed and the trackway may be swung by hand around the axis of the stem 37.

Secured to the underside of the carriage 44 and depending therefrom are hangers 78 and 79, Fig. 1, and in the lower portions of the hangers are trunnion bearings 80 and 81 of any suitable construction, having a common axis, and a motor, the housing of which is shown at 82, is supported on the trunnion bearings, and rocks thereon. A tool such as a wood saw 83 is mounted on the shaft of the motor and may be provided with a guard 84.

The work-table-top 94, preferably made of wood, is mounted on the table or base 1 for reciprocation toward and from the column 3. To this end, a forward and a rearward support 95 and 96 of metal, are mounted on the top of the table, and the forward support 95 is provided with a pair of laterally spaced apertures 97 and 98, Fig. 11, aligned with a corresponding pair of apertures 97A and 98A, Fig. 3, in the rearward support 96. These apertures are upwardly open and are circular so that they can readily be made accurate as to diameter, and the peripheries thereof communicate with slots 99—99 by which the opposite walls of the perforations are made resilient. Round steel bars 100—100 are mounted reciprocably in the apertures 97—97A and 98—98A substantially fitting the same.

The work-table-top 94 of wood is secured to the bars by screws 101—101 projected downwardly through the table top and threaded into the bars.

By this construction, the table-top may be reciprocated toward and from the column 3; and, to secure it in any determined position, a bolt 102 is provided threaded into the support 96 below the aperture 98A and at the outer end of the bolt a handle 103 is provided. By turning the bolt 102 by the handle, the aperture 98A is contracted and the bar 100 is gripped to the support 96, thereby locking the work-table-top against reciprocatory movement.

Conveniently, the handle 103 may be secured in a tube 104, telescoped over the bolt 102 and secured to the bolt by a pin 105.

Other bolts 106, 107, 108, Figs. 3 and 11, may be threaded into the supports below the other apertures 97, 97A, 98 to adjust the fit of these apertures with the bars 100—100 reciprocable therein to take up lost motion.

The work-table-top 94 has forwardly and rearwardly extending cleats 109—109 on the underside thereof; and mounted thereon and rearwardly of the table top proper is a transverse back-strip 110, Figs. 1 and 2. A fence 111 is laid upon the cleats 109—109 engaging the rearward edge of the table-top 94; and wedges 112—112 are driven in between the fence and the back strip to detachably mount the fence.

While as stated above the supporting table or base may be variously constructed, I prefer to provide the form of construction shown in Figs. 4 and 5.

Sheet metal is bent into channel form, and four channels, namely, side channels 113—113 and front and rear channels 114—114 are secured together by welding with the flanges of the channels inwardly disposed, as illustrated in Figs. 4 and 5. A channel 115 of heavy cross section comprising a web 116 and flanges 117—117 is provided of such lengths as to rest at its end under the upper flanges 118—118 of the forward and rearward channels 114—114, and is welded to these channels. Sheet metal angle pieces 119—119 are laid on the under side of the said flanges 118 and under the corresponding flanges 120—120 of the side channels 113-113 and themselves have flanges 121—121 lying against the flanges 117 of the channel 115, and these parts are welded together providing a substantially planar table upper surface, with the web 116 of the channel 115 extending longitudinally therein. The channel 115 is provided with four perforations 112—112 to receive the bolts 6, Fig. 7, and is also provided with transverse forwardly and rearwardly spaced grooves 123—123 and transversely spaced pairs of perforations 124—124 are provided in the grooves. The above described forwardly and rearwardly spaced supports 95 and 96 are seated in the said grooves, see Fig. 7, and are secured therein by bolts 125—125 projected upwardly through the perforations in the web 116 and threaded into the supports.

In the following is set forth in general, the mode of operation and the advantages of the above described tool.

The tool 83 to be driven by the motor 82 has been illustrated as a saw, such as a wood-working saw, inasmuch as this type of tool demonstrates the usefulness of the machine, but it will be understood that various other types of rotary tools may be utilized as is well known of machine tools of this class.

Work to be sawed is laid upon the table-top 94 and against the fence 111 to position it, say for cross-cutting. The trackway 42 is rotated on the arm 13 until the scale 47 indicates that the saw is at 90° with the fence 111, and then the saw is reciprocated by moving the carriage 44 along the trackway by means of a handle 126 on the hanger 78. If it be desired to cross-cut entirely through the wood, the tool 83 is lowered sufficiently for this purpose by the crank 23, after loosening the slide by the handle 22, and then again fastening it by this handle.

To ripcut, the handle 56 is loosened and the trackway 42 is rotated through 90° as indicated by the scale 47, and is then fastened again by the handle 56; and the saw is reciprocated by the handle 126. To change the width of the ripcut, the table-top 94 is first loosened by the handle 103, and the table is then reciprocated until the distance from the saw to the fence 111 is that desired; and then the table is again fastened by the handle 103.

To position the saw for right or left miter cut, the trackway 42 is moved to the desired angle indicated by the scale 47, after loosening the handle 56, and again fastened in the position by the handle.

Figure 6:
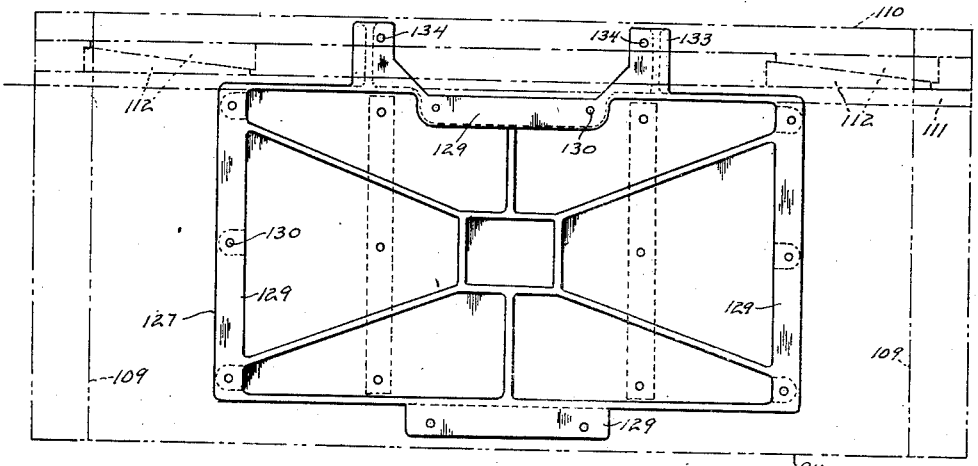
Fig. 6 is a top plan view illustrating a modification of the means of the foregoing figures for mounting a work table top on a main base or table, the view illustrating in plan particularly a casting which I may employ, and showing in broken line a work table top thereon.

In Figs. 6 and 7 is illustrated a further modification of the means for supporting the work-table-top, 94. A casting 127 is made preferably of aluminum or other light weight material, and webbed for lightness and strength, as illustrated in these figures. This casting is bolted to the above described bars 100 by bolts 128 projecting downwardly through perforations in the casting and threaded into the bars. The upper side of the casting is provided with planar surfaces 129, having threaded holes therein at 130—130; and the work-table-top proper 94, of wood, is screwed to the upper side of the casting by screws 131 projected downwardly through the table-top into the holes 130.

Extensions 132 and 133 are formed integral with the casting and provided with threaded holes 134 and upon which, as well as upon the cleats 109, the aforesaid back rail 110 may be secured by bolts 135; and the fence 111 may rest upon a part of the upper planar surface, and be secured by wedges 112, resting on the cleats 109—109, or upon the extensions 132—133, or frictionally supported in the intermediate position illustrated.

Figure 8:
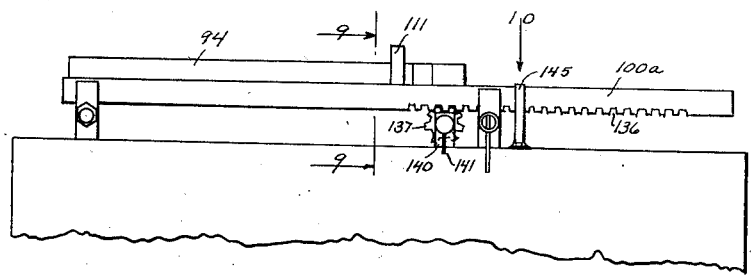
Fig. 8 is a view corresponding to a part of Fig. 1 but illustrating additional means for positioning a work table top thereof.
Figure 9:
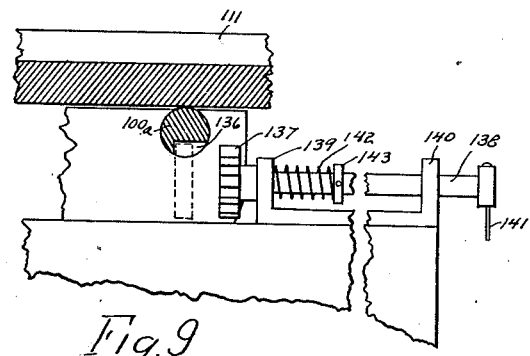
Fig. 9 is a sectional view taken from the plane 9—9 of Fig. 8.
Figure 10:
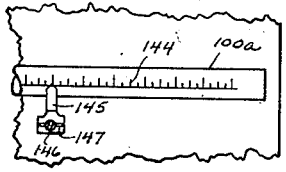
Fig. 10 is a fragmentary view taken from the direction of the arrow 10 of Fig. 8.

In the operation of the tool above described, a sufficiently accurate positioning of the table-top 94 is accomplished in most cases by moving it by hand. For example, to determine the width of a ripcut, the distance from the fence 111 to the saw blade may be measured with a pocket rule. In Figs. 8, 9, 10, however, is illustrated a construction by which the table-top, after it has been moved to approximately the desired position, may be given a micrometer movement in connection with a scale, to accurately position it without other measuring thereof.

One of the bars 100a has formed on the underside thereof a rack 136. A pinion 137 is mounted upon a shaft 138, the latter being rotatively supported in spaced bearings 139 and 140, mounted on the base 1. A handle 141 is provided on the outer end of the shaft 138. A spring 142 surrounding the shaft and abutting upon the bearing 139 at one end and at the other end abutting upon a collar 143 on the shaft 138, normally holds the shaft to dispose the pinion 137 out of engagement with, but adjacent to, the rack teeth 136.

Upon pushing inwardly on the shaft 138, the pinion teeth will be engaged with the rack teeth, and then upon turning the shaft 138 by the handle 141, the said bar 100a will be propelled forwardly or rearwardly, as will be clear.

A scale in inches or the like, as shown at 144 is provided on the upper side of the bar 100a and a scale finger 145 is mounted on the base by a bolt 146 projected through an elongated slot 147 in the finger whereby the finger 145 may, at the outset, be accurately positioned to indicate in inches the accurate position of the fence 111 with respect to the tool. Thereafter the scale 144 and the indication thereon by the finger 145 will accurately indicate the position of the fence 111, and the scale 144 may be accurately moved under the finger 145 by the handle 141 and pinion 137, as described above.

When a great change of position or great movement of the table-top 94 is desired, it may be moved forwardly or rearwardly by hand, since the pinion 137 is normally out of engagement with the rack teeth 136, and then for the last, or micrometer part of the movement, the pinion 137 may be used to finally position the table-top; and it then may be clamped in such a position, by the means described hereinbefore.

My invention is not limited to the exact details of construction illustrated and described herein, but is comprehensive of all changes and modifications thereof which come within the scope of the appended claims.

I claim:

1. An adjustably positionable work table construction for a machine tool of the type comprising a rigid main base element, a column on the base element, a laterally extending arm on the column and a horizontally reciprocable tool on the arm; the work table construction comprising a work table top disposed under the tool; a pair of metal bars of circular cross sectional contour secured in parallel relation to the under side of the table top, by means projected downwardly through the table top and into the bars at the upper sides thereof; a plurality of bearing supports for each bar on which the bars and table top are reciprocable toward and from the table; the supports being provided with circular apertures substantially fitting the bars and embracing the lower half and only part of the upper half of the bars, the supports being carried by the same rigid base element which supports the column, and disposed to provide parallelism between the bars and the planes of reciprocation of the tool; operable means to lock the bars against reciprocation in the support apertures at different reciprocated positions of the bars and table top, the bars being extended forwardly beyond the table top whereby to increase the rearward reciprocatory movement of the table top, and the bars being spaced apart transversely to straddle the column when the bars and table top are reciprocated forwardly.

2. An adjustably positionable work table construction for a machine tool of the type comprising a rigid main base element, a column on the base element, a laterally extending arm on the column and a horizontally reciprocable tool on the arm; the work table construction comprising a work table top disposed under the tool; a pair of metal bars of circular cross-sectional contour secured in parallel relation to the under side of the table top, by means projected downwardly through the table top and into the bars at the upper sides thereof; a plurality of bearing supports for each bar on which the bars and table top are reciprocable toward and from the table; the supports being provided with circular apertures substantially fitting the bars and embracing the lower half and only part of the upper half of the bars, the supports being carried by the same rigid base element which supports the column, means on the base element to predetermine the positions of the supports, to provide parallelism between the bars and the planes of reciprocation of the tool; operable means to lock the bars against reciprocation in the support apertures at different reciprocated positions of the bars and table top, the bars being extended forwardly beyond the table top whereby to increase the rearward reciprocatory movement of the table top, and the bars being spaced apart transversely to straddle the column when the bars and table top are reciprocated forwardly.

3. An adjustably positionable work table construction for a machine tool of the type comprising a rigid main base element, a column on the base element, a laterally extending arm on the column and a horizontally reciprocable tool on the arm; the work table construction comprising a work table top disposed under the tool; a pair of metal bars of circular cross sectional contour secured in parallel relation to the under side of the table top, by means projected downwardly through the table top and into the bars at the upper sides thereof; a plurality of bearing supports for each bar on which the bars and table top are reciprocable toward and from the table; the supports being provided with circular apertures substantially fitting the bars and embracing the lower half and only part of the upper half of the bars, a slot communicating with an aperture to render the support resilient at its aperture, the supports being carried by the same rigid base element which supports the column, means on the base element to predetermine the positions of the supports, to provide parallelism between the bars and the planes of reciprocation of the tool; operable means comprising means to contract the resilient aperture to lock the bars against reciprocation in the support apertures at different reciprocated positions of the bars and table top, the bars being extended forwardly beyond the table top whereby to increase the rearward reciprocatory movement of the table top and the bars being spaced apart transversely to straddle the column when the bars and table top are reciprocated forwardly.

RALPH R. ROEMER.